United States Patent [19]

Blesing et al.

[11] Patent Number: 4,553,761
[45] Date of Patent: Nov. 19, 1985

[54] SEAL

[75] Inventors: Dieter Blesing; Erich Habel, both of Fürth; Hans J. Walther, Hemsbach, all of Fed. Rep. of Germany

[73] Assignee: Firma Carl Freudenberg, Weinheim, Fed. Rep. of Germany

[21] Appl. No.: 528,512

[22] Filed: Sep. 1, 1983

[30] Foreign Application Priority Data

Dec. 8, 1982 [DE] Fed. Rep. of Germany ....... 3245338

[51] Int. Cl.[4] .............................. F16J 9/20; F16J 15/32
[52] U.S. Cl. ...................................... 277/152; 277/205
[58] Field of Search .......................... 277/152, 153, 205

[56] References Cited

U.S. PATENT DOCUMENTS

| 3,384,382 | 5/1968 | Rink ..................................... 277/205 |
| 3,527,507 | 9/1970 | Clark .................................... 277/205 |
| 3,854,737 | 12/1974 | Gilliam ................................. 277/205 |
| 4,417,503 | 11/1983 | Izumi .................................... 277/205 |

Primary Examiner—Robert I. Smith
Attorney, Agent, or Firm—Felfe & Lynch

[57] ABSTRACT

A U ring in an inwardly radially-open groove in a relatively stationary machine part for sealing a relatively axially-displaceable machine part extending therethrough has a resilient U ring body, a radially-outside statically-acting sealing lip for bearing on the bottom of the groove, and a radially-inside dynamically-acting sealing lip for bearing on the axially-displaceable machine part. The axial spacing of the statically-acting sealing lip from the adjacent end face of the groove is greater than that of the dynamically-acting sealing lip, whereby the dynamically-acting sealing lip tilts away from the axially-movable machine part when the latter forces the end of the U ring against the end face of the groove to relieve pressure along the axially-moving machine part.

9 Claims, 3 Drawing Figures

SEAL

BACKGROUND OF THE INVENTION

The invention relates to a seal for a machine part axially displaceable through an annular, internally-open groove in a stationary machine part.

Seals of this type are usually called U rings. They serve to seal reciprocating piston rods or pistons against a liquid under pressure. In high-pressure applications, it is customary to use several U rings in a row. With the usual designs, where the spacing of the dynamically-acting sealing lip from the associated end face of the groove accommodating the seal is bigger than or the same as that of the statically-acting sealing lip, this may result in a buildup of pressure in the space between the individual U rings which, in turn, may result in their premature failure.

SUMMARY OF THE INVENTION

The object of the invention is to improve a U ring of the above type in such a way that the drawbacks mentioned are no longer encountered. Apart from a reduction in leakage, it is sought, in particular, to prevent a pressure buildup between the individual U-rings in a tandem arrangement.

In accordance with the invention, this object is accomplished in a U ring seal by spacing a statically-acting sealing lip from the associated end face of an annular, internally-open groove more than the dynamically-acting sealing lip. The difference in the usual designs with a diameter between 20 and 150 mm, ranges from 0.5 to 1.5 mm. As a result, movement of the sealed machine part in the direction of the sealing lips tilts the profile of the U ring so that the side of the seal remote from the sealing lips lifts away from the machine part moving relative thereto. This produces a pressure release. Any leakage liquid entrained by the moving machine part (piston rod), and any possibly accumulated in the space between the seal and a further seal, is therefore returned much more readily under dynamically-acting sealing lip to the sealed space, where it is available for another operating cycle. In the case of U rings arranged in a row, pressure in the spaces therebetween is, at the same time, relieved. This assures favorable operating conditions for the next operating cycle.

The tilting effect can be promoted by giving the groove a profile which radially encloses the U ring in a spaced relationship, except at the static sealing lip. This results in limited radial displaceability within the groove which, in turn, results in the formation, during the working stroke, of an actual clearance between the sealing lip providing the dynamic seal and the opposed moving part.

The spacing of the sealing lips from the end face of the groove also reduces liquid pressure between the annular space enclosed by the sealing lips and said end face at the start of each operating cycle. Complete equalization is obtained when the dynamic sealing lip, ahead of its sealing edge, or the groove end face is penetrated by at least one duct extending in the radial direction. If several ducts are provided, they should be distributed as uniformly as possible. The ducts in the sealing lip may be open in the axial direction in the manner of a U or be formed by the spaces between nubs extending in the axial direction and terminating in a common radial plane.

The tilting of the profile of the proposed seal as a function of the direction of motion of the dynamically sealed machine part thus produces a valve effect which assures the substantial interruption of the flow of liquid when the machine part moves in the working direction, and maximum flow when it moves counter to the working direction. This effect may also be obtained by the use of U rings with sealing lips which in the axial direction, are of equal length if the cooperative end face of the groove direction is stepped to provided a smaller axial spacing to the dynamically-acting sealing lip than to the statically-acting sealing lip. In contrast thereto, rectangular grooves with planar end faces in the radial direction can be produced much more readily, and such designs are therefore preferred in conjunction with a seal wherein the dynamically-acting sealing lip extends the required amount in the axial direction beyond the statically-acting sealing lip by.

BRIEF DESCRIPTION OF THE DRAWINGS

The invention will now be described in greater detail with reference to the accompanying drawings, wherein.

DETAILED DESCRIPTION OF THE INVENTION

Figure 1:
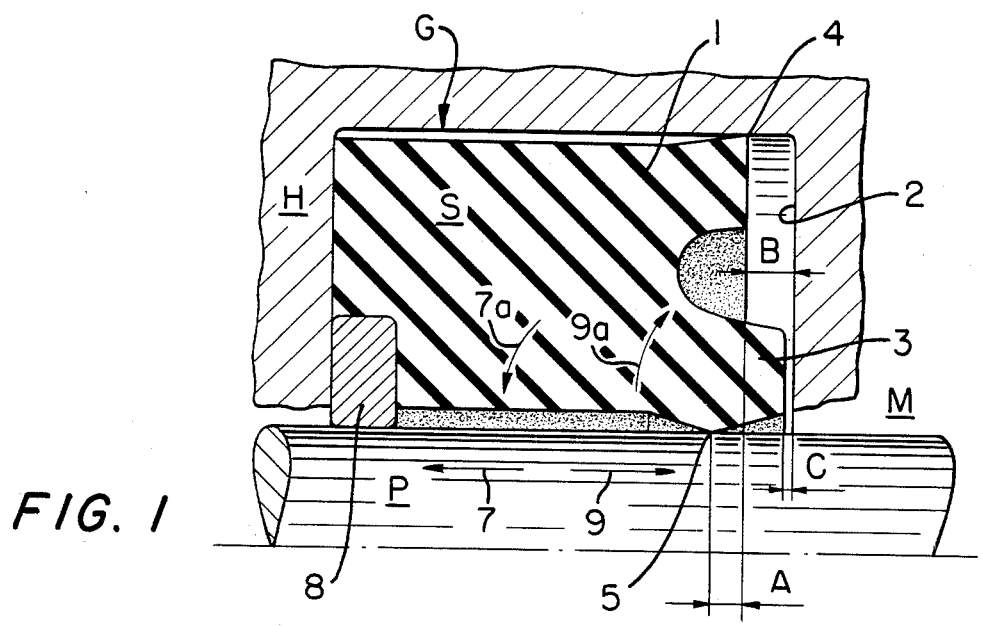
FIG. 1 illustrates half an embodiment, in section, for use in a groove of rectangular section.

Shown in FIG. 1 is a U ring seal S for use in the clearance space between a piston rod P and a housing H. The seal ring is made of a resilient rubber-elastic material and has a substantially rectangular section axially of the piston rod which, near the end facing the medium M to be sealed, is enlarged on the outside by a statically-acting sealing lip 1 and on the inside by a dynamically-acting sealing lip 3. The statically-acting sealing lip has a peripheral sealing edge 4 which bears with elastic pretension on a boundary surface of a groove G in the housing, while the dynamically-acting sealing lip 3 has a sealing edge 5 which bears with elastic pretension on the piston rod P which, in operation, reciprocates as indicated by the arrows 7, 9. The pressure of the medium M to be sealed in the U space between the statically- and the dynamically-acting sealing lips also force them against the associated machine parts. The piston-rod reciprocation and the pressure may axially compress the seal, in which case squeezing the seal material into the sealed clearance (at the left in FIG. 1) is prevented by a back-up ring 8 made of a tough, hard material.

The spacing B of the statically-acting sealing lip from the associated end face 2 of the groove G is greater than the spacing C of the dynamically-acting sealing lip. The latter therefore impinges on the associated end face 2 of the groove before the statically-acting sealing lip does when the piston rod P moves in the direction of arrow 9. This tilts the seal ring upward at the left in FIG. 1 about a center rightward of sealing edge 5 as indicated by arrow 9a. Any liquid entrained leftwardly by the piston rod during this movement can thus be returned to the sealed space M where it is available for further use under the reduced pressure (or clearance) between the sealing edge 5 and the piston rod P. The opposite motion of the piston rod indicated by arrow 7 oppositely tilts the seal as shown by arrow 7a to restore the seal at edge 5.

Figure 2:
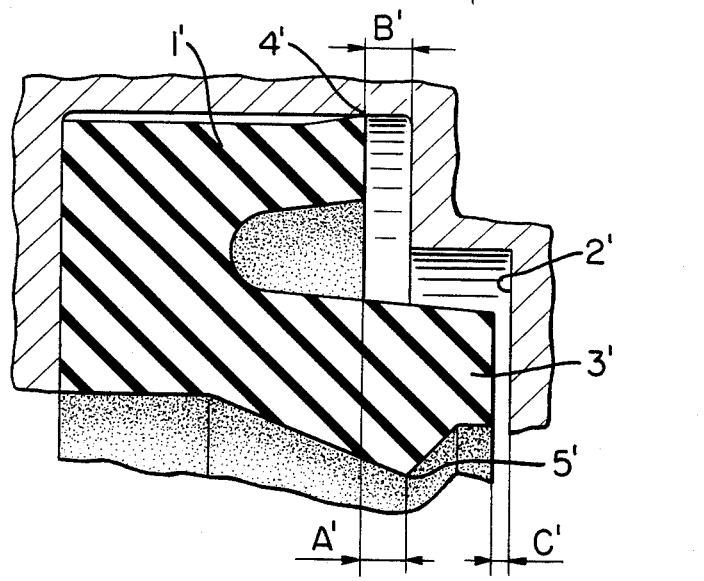
FIG. 2 illustrates half an embodiment, in section, for use in a groove with a stepped end face.

The embodiment according to FIG. 2 corresponds with respect to its principle of operation to the one just described. However, the sealing edge 5' of the dynamically-acting sealing lip 3' is on the other side, axially, of the sealing edge 4' of the statically-acting sealing lip 1'. The axial spacing of the statically-acting sealing lip from the associated, stepped, radially-extending end face 2' of the groove, however, remains greater than the axial spacing of the dynamically-acting sealing lip.

Figure 3:
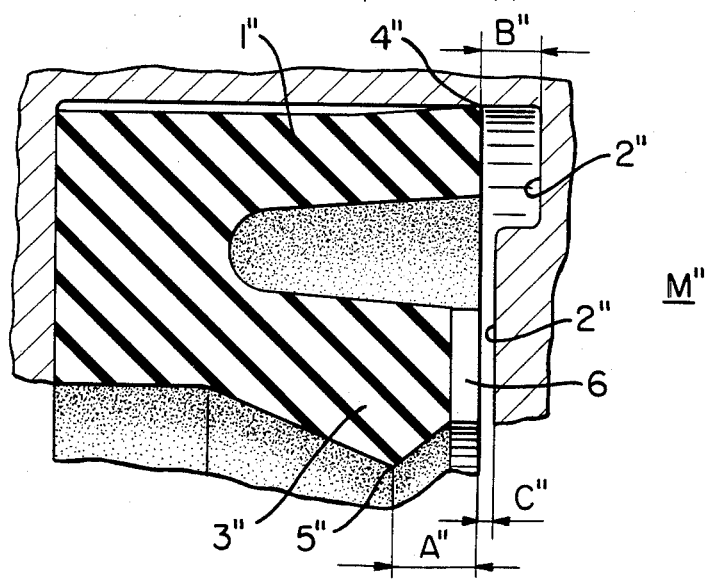
FIG. 3 illustrates half another embodiment, in section, for use in a groove with a stepped end face.

The embodiment according to FIG. 3 also corresponds with respect to its principle of operation to the one shown in FIG. 1. However, the sealing edge 4'' of the statically-acting sealing lip 1'' here extends axially beyond the sealing edge 5'' of the dynamically-acting sealing lip 3''. The tilting motion, which especially in the case of tandem arrangements can be troublesome, is facilitated thereby. The annular space enclosed between the two sealing lips and the associated stepped end face of the groove communicates directly with the sealed space M'' through a radially extending duct 6 in the dynamically-acting sealing lip. This allows any pressure drop therefore to have an immediate effect on the annular space and the U in the ring opening therefrom, and also aids the lifting of the sealing edge 5'' from the surface of the piston rod (not shown). The axial spacing B'' of the statically-acting sealing lip from the associated area of the groove end face, however, remains greater than the axial spacing C'' of the dynamically-acting sealing lip. In place of the duct 6 which penetrates the sealing lip 3 in the radial direction, it is of course possible in such an embodiment to provide one or more openings through the end face 2, the effect of which will be the same.

It will be appreciated that the instant specification and claims are set forth by way of illustration and not of limitation, and that various changes and modifications may be made without departing from the spirit and scope of the present invention.

What is claimed is:

1. In a U ring for a seal for a machine part relatively axially displaceable through an annular, internally-open groove having an end face in a relatively stationary machine part, the U ring for the seal having a body of resilient material, an enlarged, radially-outside sealing-lip portion for forming a statically-acting seal with the groove, and an enlarged, radially-inside sealing lip portion near one end of the U ring for forming a dynamically-acting seal with the axially-displaceable machine part which extends therethrough, the improvement to the U ring made by the process comprising:
   dimensioning the U ring along the radially outside, statically-acting seal portion thereof to the end having the dynamically-acting seal relative to the end face of the groove in which the U ring will be used such that the spacing between the outside portion and the groove end face is greater than the spacing between the inside portion and the groove end face; and
   positioning the statically-acting and the dynamically-acting seals along the respective radial outside the inside portions of the U ring relative to the resilience of the U ring body such that the dynamically-acting seal tilts from the relatively displaceable machine part when the latter moves to force the U ring against the groove end face.

2. In the combination of a U ring in an annular, internally-open groove in a relatively stationary machine part for sealing about a machine part relatively axially-displaceable therethrough, the U ring having a body of resilient material, a sealing lip on a radially-outside end portion for forming a statically-acting seal with the groove, and a sealing lip on a radially-inside, corresponding end portion for forming a dynamically-acting seal with the axially-displaceable machine part when it extends therethrough, the groove having an end face at the corresponding end portions of the U ring, the improvement to the combination of the U ring and groove, comprising:
   a greater space between the end portion of the U ring having the statically-acting seal and the end face of the groove than between the end portion of the U ring having the dynamically-acting seal and the end face of the groove for abutting the latter two first upon appropriate axial displacement of the axially-displaceable machine part.

3. The U ring of claim 1, and additionally comprising a sealing edge on each sealing lip, the sealing edge on the sealing lip of the statically-acting seal being farther from the end face of the groove than the sealing edge on the sealing lip of the dynamically-acting seal.

4. The U ring and groove combination of claim 2, and additionally comprising a sealing edge on each sealing lip, the sealing edge on the sealing lip of the statically-acting seal being farther from the end face of the groove than the sealing edge on the sealing lip of the dynamically-acting seal.

5. The U ring of claim 1, and additionally comprising at least one radial duct across the end of the sealing lip forming the dynamically-acting seal for relieving pressure between the U ring and the end face of the groove.

6. The U ring and groove combination of claim 2, and additionally comprising at least one radial duct across the end of the sealing lip forming the dynamically-acting seal for relieving pressure between the U ring and the end face of the groove.

7. The U ring of claim 3, and additionally comprising at least one radial duct across the end of the sealing lip forming the dynamically-acting seal for relieving pressure between the U ring and the end face of the groove.

8. The U ring and groove combination of claim 4, and additionally comprising at least one radial duct across the end of the sealing lip forming the dynamically-acting seal for relieving pressure between the U ring and the end face of the groove.

9. A seal and a radially-open groove of a stationary machine for sealing about a machine part axially displaceable therethrough, comprising: a resilient ring body having a substantially rectangular section which, on a side adjacent a face of the groove, is extended to form a U-shape with a statically-acting, first sealing lip (4) for bearing on the bottom of the groove and, radially spaced therefrom, a dynamically-acting, second sealing lip (3) for bearing on the axially displaceable machine part, characterized in that the axial spacing of the statically-acting, first sealing lip (4) from the adjacent face (2) of the groove is greater than that of the dynamically-acting, second sealing lip (3) for abutting the latter with the groove first upon appropriate axial displacement of the axially-displaceable machine part.

* * * * *